(12) United States Patent
Nestares et al.

(10) Patent No.: US 10,771,758 B2
(45) Date of Patent: Sep. 8, 2020

(54) IMMERSIVE VIEWING USING A PLANAR ARRAY OF CAMERAS

(71) Applicant: INTEL CORPORATION, Santa Clara, CA (US)

(72) Inventors: Oscar Nestares, San Jose, CA (US); Kalpana Seshadrinathan, San Jose, CA (US); Vladan Popovic, Santa Clara, CA (US); Horst Haussecker, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 71 days.

(21) Appl. No.: 16/139,880

(22) Filed: Sep. 24, 2018

(65) Prior Publication Data

US 2019/0045167 A1 Feb. 7, 2019

(51) Int. Cl.
| | | |
|---|---|---|
| *G06T 7/70* | (2017.01) | |
| *H04N 13/111* | (2018.01) | |
| *G06K 9/32* | (2006.01) | |
| *G11B 27/022* | (2006.01) | |
| *H04N 9/04* | (2006.01) | |
| *H04N 5/247* | (2006.01) | |
| *G11B 27/031* | (2006.01) | |

(52) U.S. Cl.
CPC ......... *H04N 13/111* (2018.05); *G06K 9/3233* (2013.01); *G06T 7/70* (2017.01); *G11B 27/022* (2013.01); *G11B 27/031* (2013.01); *H04N 5/247* (2013.01); *H04N 9/045* (2013.01)

(58) Field of Classification Search
CPC ........ H04N 13/111; H04N 9/045; G06T 7/70; G06K 9/3233; G11B 27/031; G11B 27/022
See application file for complete search history.

(56) References Cited

U.S. PATENT DOCUMENTS

| | | | | |
|---|---|---|---|---|
| 2016/0165215 A1* | 6/2016 | Gu | ......................... | G06T 17/00 |
| | | | | 348/43 |
| 2016/0381350 A1* | 12/2016 | Ji | .............................. | G06T 3/20 |
| | | | | 348/54 |
| 2017/0243384 A1* | 8/2017 | Huang | ................... | G06T 3/0093 |

OTHER PUBLICATIONS

Chaurasia et al., "Depth Synthesis and Local Warps for Plausible Image-Based Navigation", ACM, 2013 (Year: 2013).*
Google VR; Google Developers; "Magic Window"; Jan. 1, 2018; retrieved online at https://developers.google.com/vr/develop/unity/guides/magic-window on Dec. 17, 2018.

* cited by examiner

*Primary Examiner* — Diane M Wills
(74) *Attorney, Agent, or Firm* — Green, Howard & Mughal LLP

(57) ABSTRACT

Techniques related to generating a virtual view from multi-view images for presentation to a viewer are discussed. Such techniques include determining, based on a viewer position relative to a display region, first and second crop positions of planar image and cropping the planar image to a cropped planar image to fill the display region using the first and second crop positions such that the first and second crop positions define an asymmetric frustum between the cropped planar image and a virtual window corresponding to the display region.

20 Claims, 10 Drawing Sheets

IMMERSIVE VIEWING USING A PLANAR ARRAY OF CAMERAS

BACKGROUND

Arrays of cameras such as two or more linearly aligned cameras are becoming increasingly common in a variety of device implementations such as tablet devices, smartphone devices, laptop devices, display devices, telepresence systems, and filmmaking and video production systems. In the context of a viewing experience generated by such camera arrays, intermediate virtual views between cameras are generated and provided to a user for display.

Current techniques for synthesizing such intermediate views render views interpolated between the camera positions. However, such views are not visually intuitive and may feel artificial to the user. For example, such views, as if provided by virtual cameras in the planar array, may not correspond to what a user would see when looking through a window defined by the display they are viewing.

It may be advantageous to improve views of synthesized intermediate images for enhanced user experience. It is with respect to these and other considerations that the present improvements have been needed. Such improvements may become critical as the desire to display such images or videos in the context of camera array implementations becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
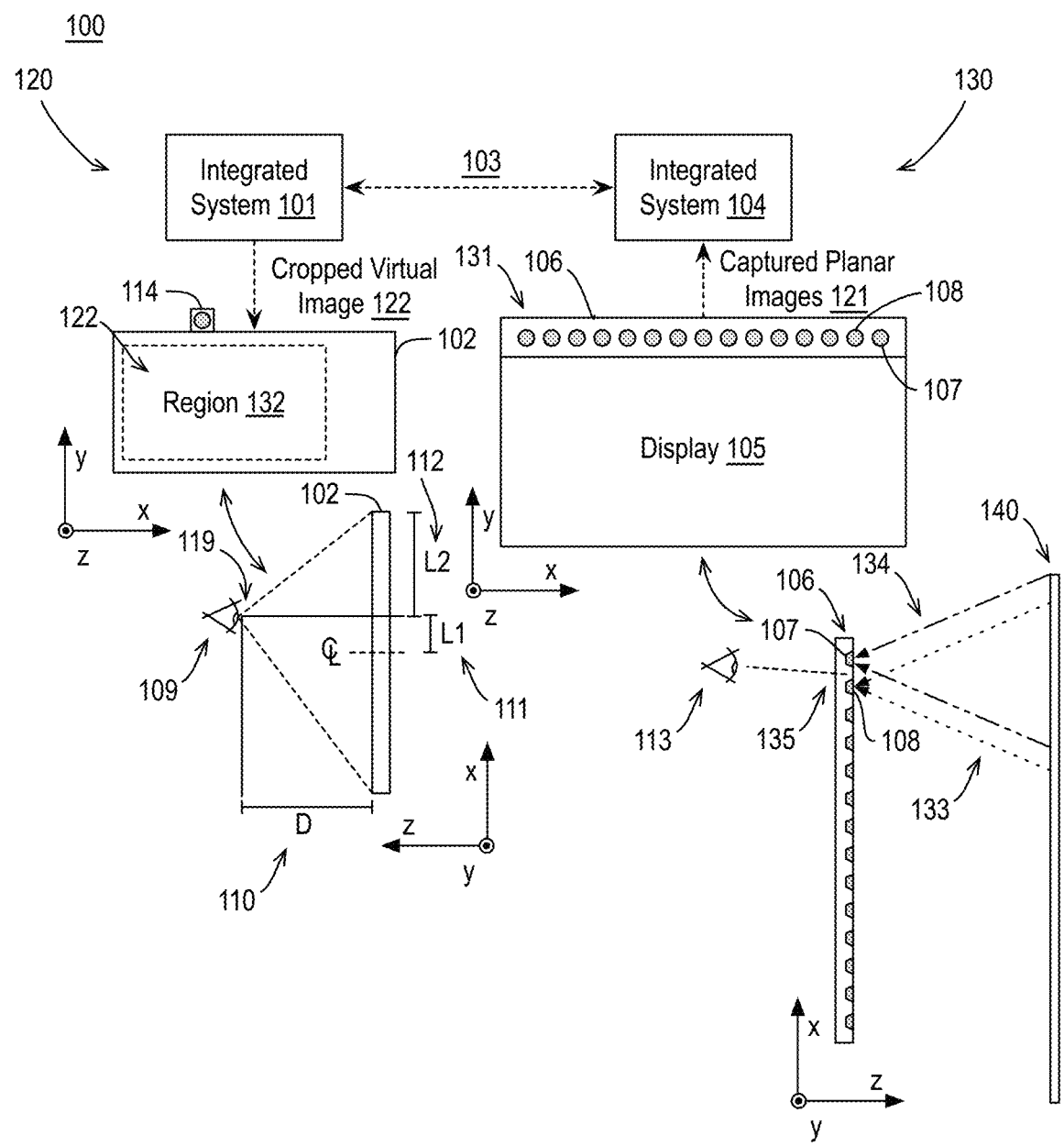
FIG. 1 illustrates an example context for generating a virtual view from multi-view images.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to generating a virtual view of a scene from multi-view images of the scene.

As described above, it may be advantageous to improve views of synthesized intermediate images for enhanced user experience. For example, to provide an immersive experience for viewing content created by planar camera arrays, simply rendering views interpolated between camera positions does not create a visually intuitive experience for human observers. In particular, the parallel views with symmetric frustums provided by cameras in the planar array do not correspond to what a user would see when looking through a window defined by a display they are viewing. This is because the physical boundaries of a display at a certain distance from the user limits the field of view (FOV) and corresponds to an asymmetric frustum of a view looking at the scene from the same viewpoint. The techniques discussed herein provide an immersive experience for content captured using a planar camera array. Such techniques advantageously offer low processing requirements and real-time operation to provide an interactive immersive visual experiences to viewers.

In some embodiments, a first planar image representative of a scene is attained based on multiple planar images of the scene. The first planar image corresponds to viewer position relative to a display region that the viewer is viewing translated to coordinates of the image capture device that is capturing or captured the multiple planar images of the scene. The first planar image may be an actual captured image (if the viewer position translates to a camera position or a position within a threshold distance of a camera position) or the first planar image may be a synthesized planar image interpolated between the images attained from adjacent camera positions (if the viewer position translates to a position between camera positions). As used herein, the term planar image indicates an image having a substantially flat or planar image plane and may be contrasted with images attained using fish eye cameras and/or those having curved image planes including 360° image content.

Based on the viewer position relative to the display region, a virtual window is generated in the image capture domain and crop positions of the first planar image are determined using the virtual window. The virtual window corresponds to the display region the viewer is viewing and the spatial relationship of the viewer to the display region. The virtual window provides a virtual view or window onto the scene being captured by the multiple captured planar images. The translation from the viewer position relative to the display region to the virtual window may be performed using any suitable technique or techniques such as scaling and translation techniques. The crop positions include a first crop position and a second crop position opposite the first crop position. As used herein, the term opposite with respect to images and image positions indicates the positions are aligned along a dimension of the planar image with the dimension also being aligned along an edge of the planar image. For example, the planar image may have a horizontal dimension (e.g., x-dimension) and a vertical dimension (e.g., y-dimension) that are each along edges of the planar image. Two positions opposite one another would then be aligned along the x- or y-dimension. Similarly, two crop edges or lines would be parallel and opposite one another along the x- or y-dimension. The crop positions are typically aligned along the same dimensional along which the multiple planar images are aligned. The term opposite used herein does not indicate the positions are opposite a center of the planar image although they may be in some instances.

In an embodiment, the crop positions are determined such that the first crop position is at a position away from a midpoint of the first planar image toward a first edge of the first planar image by a ratio of a focal length corresponding to the first planar image and a depth of the viewer from the virtual window multiplied by a lateral position of the viewer away from a first edge of the display region corresponding to the first edge of the first planar image, as is discussed further herein. As used herein, the term corresponding edges indicates both edges are at the position of the images (e.g., corresponding left edges, right edges, top edges, or bottom edges of two images). In an embodiment, the second crop position is at a second position away from the midpoint of the first planar image toward a second edge of the first planar image opposite the first edge by the ratio of the focal length and the depth multiplied by a difference between a width of virtual window minus the lateral position of the viewer from the first edge of the virtual window, as is discussed further herein. In another embodiment, such as when the viewer is viewing from outside of the edges of the virtual window, the second crop position is at a position moved from the midpoint of the first planar image toward the first edge of the first planar image by the ratio of the focal length and the depth multiplied by a difference between the lateral position of the viewer from the first edge of the display minus a width of the virtual window.

FIG. 1 illustrates an example context 100 for generating a virtual view from multi-view images, arranged in accordance with at least some implementations of the present disclosure. As shown in FIG. 1, in context 100, a system 120 and a system 130 are communicatively coupled via communications connection 103. Communications connection 103 may be any suitable connection(s) capable of transmitting data between system 120 and system 130 such as any combination of wired or wireless couplings between any number of intervening devices. As shown, system 120 includes an integrated system 101, a display 102, and a camera 114 (e.g., a webcam). System 130 includes a monitor 106 including a display 105 and an array of cameras 131 and an integrated system 104. Integrated systems 101, 104 may include any suitable components for processing data (e.g., processors), storing data (e.g., memory), and communicating data (e.g., transmitters and receivers) as discussed herein. System 120 and/or system 130, or portions thereof, may be implemented in any suitable form factor device such as a personal computer, a laptop computer, a tablet, a phablet, a smart phone, a digital camera, a gaming console, a wearable device, a display device, an all-in-one device, a two-in-one device, or the like.

Either or both of systems 120, 130 may generate a virtual view from multi-view images as discussed herein. In an embodiment, system 130 generates a cropped virtual image 122 (e.g., using captured planar images 121 and a viewer position received from system 120) for presentation in a display region 132 of display 102 and system 130 transmits cropped virtual image 122 over communications connection 103 to system 120. In another embodiment, system 120 generates cropped virtual image 122 using one or more received captured planar images 121 (e.g., received from system 130 via communications connection 103) or using a synthesized image received from system 130 via communications connection 103). Notably, systems 120, 130 may perform any suitable portions of the techniques discussed herein to generate cropped virtual image 122 for presentation in display region 132 of display 102.

Display 102 may include any suitable display screen or device such as an LCD screen or the like. Display region 132 may be a window a viewer is viewing of display 102 that presents cropped virtual images 122 such that cropped virtual images 122 are representative of a scene 140 as discussed further herein. As illustrated, in some embodiments, display region 132 is a portion of display 102. In an embodiment, display region 132 fills display 102. Display region 132 may be characterized as a view window, a virtual window, simply a window, or the like.

Display 105 may also include any suitable display screen and, notably, display 105 may not be implemented in some embodiments. For example, monitor 106 having display 105 and array of cameras 131 may be a suitable implementation; however, only array of cameras 131 is needed for the techniques discussed herein. Array of cameras 131 may include any number of planar cameras such as two, three, four, or more, such as 15 in the illustrated embodiment, including planar camera 107 and planar camera 108. As shown, in some embodiments, array of cameras 131 are laterally (e.g., horizontally) aligned. In other embodiments, array of cameras 131 are vertically aligned. In yet other embodiments, array of cameras 131 are in a grid pattern such that some are laterally aligned and others are vertically aligned.

As shown, camera 107 receives incoming light 134 from scene 140. Camera 107, based on exposure to incoming light 134, generates an image of captured planar images 121. Similarly, camera 108 receives incoming light 133 from scene 140 and, based on exposure to incoming light 133, generates another image of captured planar images 121. Similarly each camera of array of cameras 131 generates an image of captured planar images 121 such that such images may be contemporaneous images of scene 140. Array of cameras 131 may include suitable imaging devices such as RGB cameras or the like. In some embodiments, each of array of cameras 131 have the same focal length and fields of view (FOV) and the generated images have the same dimensions and resolutions. In an embodiment, each of array of cameras 131 has a resolution of 1080p and 70° FOV and array of cameras 131 are spaced about 3.6 cm apart. However, any suitable resolution, FOV, and spacing may be used. Although discussed herein with respect to image capture via array of cameras 131, planar images 121 may be received from another image capture device, generated using render techniques (e.g., graphics rendering techniques), etc. Captured planar images 121 may include any suitable image data, picture data, frame data, or the like or any data structure representative of a picture at any suitable resolution. In an embodiment, captured planar images 121 each include RGB image data each having R (red), G (green), and B (blue), values for pixels thereof. In an embodiment, captured planar images 121 have a resolution of 1920×1080 pixels. However, any suitable color space and resolution may be implemented.

As shown, a viewer 109 is viewing display region 132 of display 102. Viewer 109 is at a viewer position 119 relative to display 102 indicated by a depth 110, D, from display 102 and a lateral dimension 112, L2, from an edge (e.g., a left edge) of display 102, a lateral dimension 111, L1, from a centerline of display 102 along a horizontal dimension, or any other suitable lateral dimension. As used herein, the term lateral indicates a dimension or movement in a horizontal dimension (e.g., the x-dimension). Furthermore, viewer position 119 may include a vertical dimension (e.g., a dimension in y-dimension) indicating vertical position of viewer 109. Notably, image processing techniques herein are discussed with respect to horizontally aligned images captured by a horizontally aligned array of cameras 131. However, the discussed techniques may be applied in the vertical direction and array of cameras 131 may be vertically aligned. In an embodiment, array of cameras 131 includes a grid of cameras having vertically aligned columns of camera arrays and horizontally aligned rows of camera arrays. As used herein, the term camera array indicates two or more aligned cameras.

Also as shown, viewer position 119 in the coordinate system of system 120 may be translated to a viewer position 113 in the coordinate system of system 130 using any suitable technique or techniques such as scaling and/or translation techniques to determine a suitable image capture position 135 that corresponds to viewer position 119. Image capture position 135 may be aligned with a position of one of array of cameras 131 or image capture position 135 may be between positions of array of cameras 131 (as illustrated). In an embodiment, a determination may be made as to whether image capture position 135 is at a camera position or within a threshold distance of the camera position. If so, the corresponding image of captured planar images 121 (e.g., the planar image from the camera at that position) is used to generate cropped virtual images 122. If not, a synthesized image is generated for the position between the cameras using the images from those cameras. For example, for image capture position 135 between the positions of cameras 107, 108, using planar images from of cameras 107, 108, a synthesized image is generated as if taken at image capture position 135. In such examples, the synthesized image (or intermediate image) is used to cropped virtual images 122. The generation of cropped virtual images 122 from the attained planar image (e.g., one of captured planar images 121 or a synthesized image generated using two of captured planar images 121) using viewer position 119 and other characteristics of systems 120, 130 is discussed further herein below.

Figure 2:
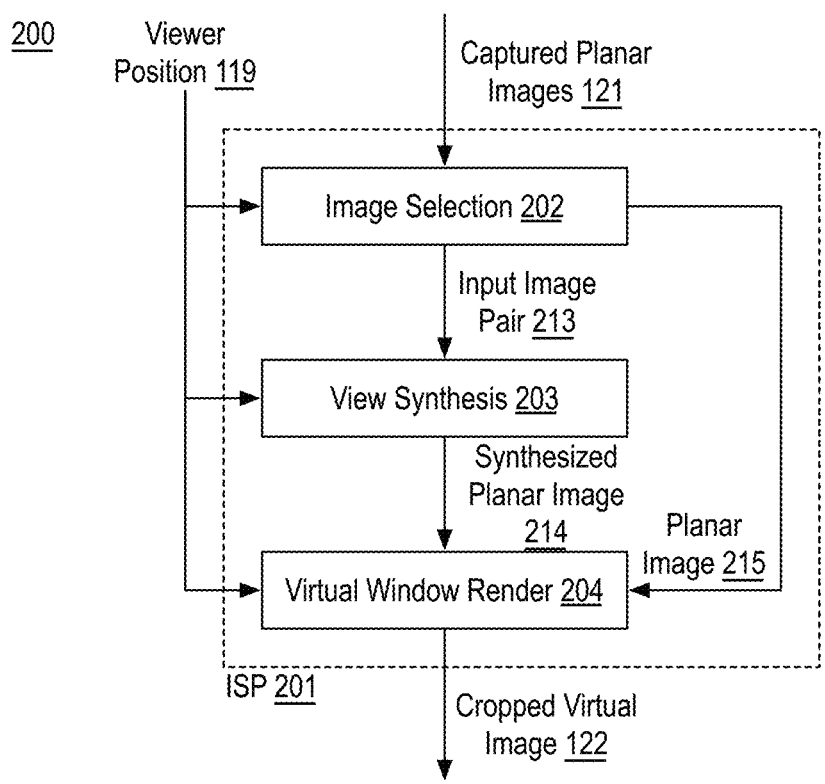
FIG. 2 illustrates an example device for generating a virtual view from multi-view images.

FIG. 2 illustrates an example device 200 for generating a virtual view from multi-view images, arranged in accordance with at least some implementations of the present disclosure. As shown in FIG. 2, device 200 includes an image signal processor 201 that includes or implements an image selection module 202, a view synthesis module 203, and a virtual window render module 204. Device 200, or portions thereof, may be implemented in any suitable form factor device such as a personal computer, a laptop computer, a tablet, a phablet, a smart phone, a digital camera, a gaming console, a wearable device, a display device, an all-in-one device, a two-in-one device, or the like. For example, device 200 may generate a virtual view from multi-view images as discussed herein such that the virtual view may be provided for presentation to a viewer. In some embodiments, device 200 includes a display (e.g., display 102) to present the virtual view and to detect viewer position (e.g. viewer position 119). In some embodiments, device 200 includes a camera array (e.g., array of cameras 131) to capture planar images for processing. However, device 200 need not employ a display nor a camera array. As used herein, providing an image for presentation includes transmitting the image to a display device, storing the image to memory for later display, and/or transmitting the image to another device for display at that device.

As shown, image selection module 202 receives captured planar images 121 and viewer position 119. Captured planar images 121 include any suitable image data and captured planar images 121 may be preprocessed using any suitable technique or techniques. Viewer position 119 includes any suitable data indicative of a position of a viewer relative to a display the viewer is viewing such as depth from the display (e.g., depth 110) and a lateral distance of the viewer from an edge of the display (e.g., lateral dimension 112) or similar dimensional data. Viewer position 119 may be determined using any suitable technique or techniques. In an embodiment, viewer position 119 is generated by a webcam (e.g., camera 114) and face detection and head pose estimation techniques.

Based on viewer position 119, image selection module 202 determines a corresponding image capture location (e.g., image capture location 135) relative to the locations of the cameras used to capture captured planar images 121. The corresponding image capture location may be determined using any suitable technique or techniques such as scaling and/or translating viewer position 119 to the coordinate system of the locations of the cameras used to capture captured planar images 121. In an embodiment, when the image capture location is at, or within a threshold distance (e.g., 0.3 to 0.5 mm) of a location of a particular camera, the image from that camera is selected by image selection module 202 and transmitted (or indicated) to virtual window render module 204 as planar image 215.

When the image capture location is not at or within a threshold distance of a location of a particular camera, image selection module 202 determines the image pair corresponding to cameras that surround (e.g., are adjacent to and opposite) the image capture location. The image pair is transmitted (or indicated) to view synthesis module 203 as input image pair 213. View synthesis module 203 also receives viewer position 119 (or image capture location 135) or an indication as to the relative position of image capture location between the cameras corresponding to input image pair 213 or between input image pair 213.

View synthesis module 203, based on input image pair 213 and the location between them for which the view is to be synthesized (e.g., a virtual camera location), generates a synthesized planar image 214. Synthesized planar image 214 may be generated using any suitable technique or techniques. In an embodiment, bi-directional disparity maps are generated based on input image pair 213 and input image pair 213 are warped using the bi-directional disparity maps to provide synthesized planar image 214. Such bi-directional disparity maps include disparity or shift values (e.g., in pixels) for each pixel value or for multi-pixel regions of input image pair 213 and such bi-directional disparity maps are a function of the 3D depth of the scene (e.g., scene 140). In an embodiment, the camera array used to capture input captured planar images 121 are geometrically calibrated and rectified such that the disparity estimation used to generate the bi-directional disparity maps may implement stereo disparity matching between input image pair 213. Such techniques advantageously allow for real-time processing and interaction for a user (e.g., real-time interaction between systems 120, 130 may be implemented). As discussed, the bi-directional disparity maps and input image pair 213 are then used to generate synthesized planar image 214. In an embodiment, the known disparity from the bi-directional disparity maps is used to warp each of input image pair 213 to image capture location 135. In an embodiment, any holes in synthesized planar image 214 are filled using nearest neighbor interpolation, bilinear interpolation, or any other suitable interpolation technique.

For a particular time instance, one of planar image 215 or synthesized planar image 214 are received by virtual window render module 204. Virtual window render module 204 also receives viewer position 119 and virtual window render module 204 generates, based on viewer position 119 and one of planar image 215 or synthesized planar image 214, cropped virtual image 122. Notably, cropped virtual image 122, when presented to a viewer, provides an immersive visual experience generated from a camera array based on the viewing position of the viewer. Such a view, as provided by cropped virtual image 122 may be generated and displayed in real-time and corresponds to the view that would have been seen by the user if the display region were to act as a window through which they view a scene to provide a convincing and immersive experience.

Figure 3:
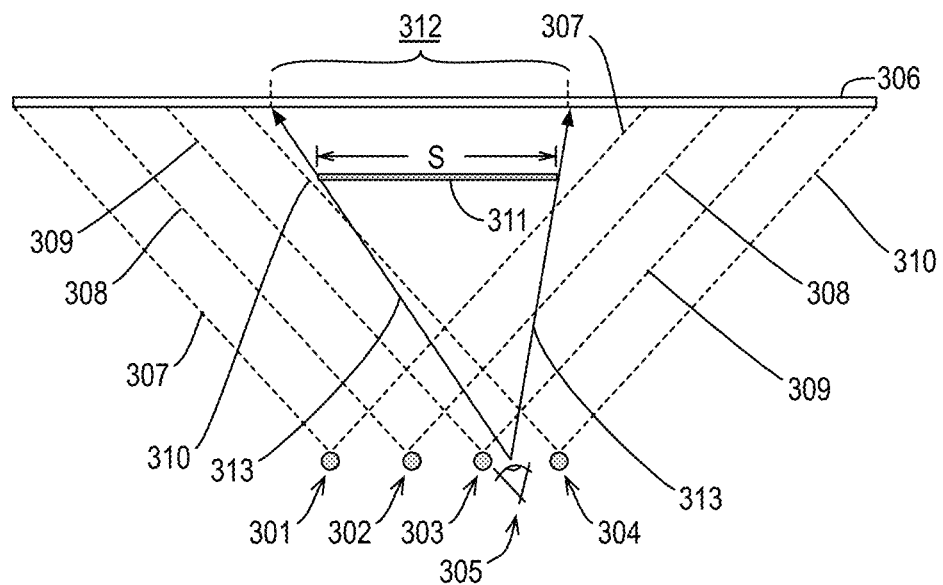
FIG. 3 illustrates exemplary parallel cameras and an example translated virtual viewer position viewing an image plane.

FIG. 3 illustrates exemplary parallel cameras 301-304 and an example translated virtual viewer position 305 viewing an image plane 306, arranged in accordance with at least some implementations of the present disclosure. As shown in FIG. 3, each of parallel cameras 301-304 has a corresponding frustum 307-310 such that frustum 307 corresponds to camera 301, frustum 308 corresponds to camera 302, frustum 309 corresponds to camera 303, and frustum 310 corresponds to camera 304. Notably, each of frustums 307-310 are symmetric about a line extending along the z-axis from each of parallel cameras 301-304 to image plane 306 (and, therefore, orthogonal to image plane 306). Notably, presenting a view having a symmetric frustum 307-310 (or a synthesized view from virtual viewer position 305 having a symmetric frustum) provides a view that is not intuitive because the viewer typically also turns their head to view the scene presented by image plane 306 via a display as if they were looking through a window.

Also as shown in FIG. 3, using the techniques discussed herein, a virtual window 311 of width S is placed between virtual viewer position 305 and image plane 306 and the scene of image plane 306 visible through virtual window 311 is rendered as a virtual image plane portion 312. As shown, virtual image plane portion 312 and virtual window 311, as correspond to virtual viewer position 305, provide an asymmetric frustum 313 such that asymmetric frustum 313 is not symmetric about a line along the z-axis extending virtual viewer position 305 to image plane 306 (and orthogonal to image plane 306). For example, the left side of asymmetric frustum 313 is longer than the right side. Virtual window 311 may be generated using any suitable technique or techniques. In an embodiment, virtual window 311 is located relative to virtual viewer position 305 and image plane 306 based on the viewer location 119. As is discussed further herein, a planar image (not shown in FIG. 3) is situated between virtual window 311 and virtual viewer position 305, crop positions of the planar image are determined, and the planar image is cropped to a virtual cropped image.

Figure 4:
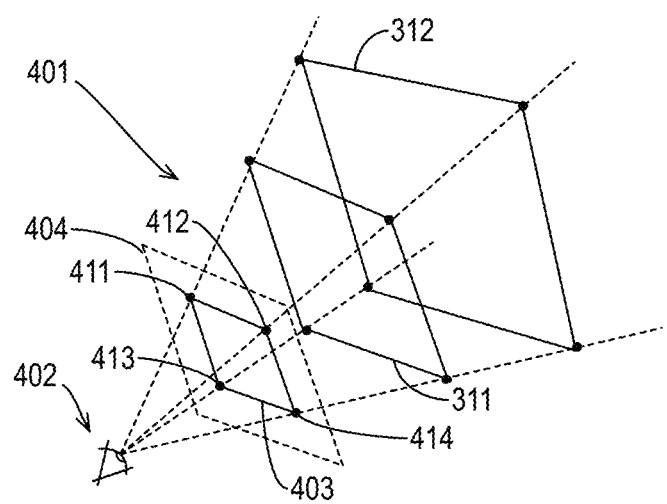
FIG. 4 illustrates an example asymmetric frustum from a viewing position.

FIG. 4 illustrates an example asymmetric frustum 401 from a viewing position 402, arranged in accordance with at least some implementations of the present disclosure. As shown in FIG. 4, asymmetric frustum 401 is defined by virtual window 311 and virtual image plane portion 312 corresponding to virtual window 311 as well as virtual cropped image 403, which is cropped from planar image 404 as discussed further herein below using crop positions 411, 412, 413, 414. As used herein, the term crop position may be any line, point, or position that defines a cropping of an image from a larger image.

Figure 5:
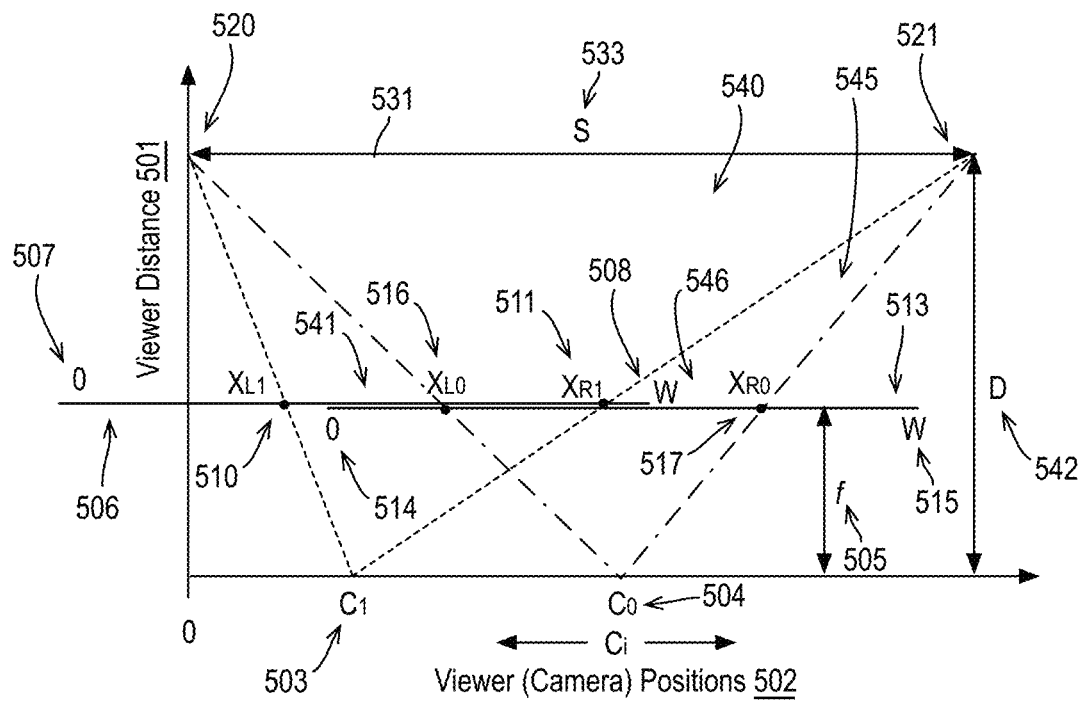
FIG. 5 illustrates example virtual viewer positions and corresponding example crop positions for cropping planar images to cropped virtual images.

FIG. 5 illustrates example virtual viewer positions and corresponding example crop positions for cropping planar images to cropped virtual images, arranged in accordance with at least some implementations of the present disclosure. In FIG. 5, the horizontal axis indicates lateral positions (e.g., x-axis positions) as discussed herein and the vertical axis indicates depth positions (e.g., z-axis positions) as discussed herein such that FIG. 5 may be a top down view. Notably, a virtual viewer position may be at any virtual viewer position 502 along the horizontal axis and any viewer distance 501 along the vertical axis. In turn, virtual viewer position 502 may be at any location relative to a virtual window 531. Virtual window 531 has a virtual window width 533, S, a first (left) edge 520 at a lateral position defined as zero (0) and a second (right) edge 521 at a position S as defined by width 533, S, of virtual window 531. Virtual viewer position 502 is defined relative to first (left) edge 520 such that virtual viewer position 502 is a lateral position or distance from first (left) edge 520. Furthermore, virtual window 531 and virtual viewer position 502 are separated by a distance or depth 542, D, which is also variable depending on the depth position of virtual viewer position 502. It is noted that in the example of FIG. 5, the image plane is beyond virtual window 531 in the vertical direction.

Virtual viewer position 502 and virtual window 531 are oriented with respect to planar image 506 using any suitable technique or techniques that translates viewer position 119 (at system 120, please refer to FIG. 1) to the coordinate system of planar image 506 such as scaling and/or translation techniques. Thereby, from any viewer position 119, any virtual viewer position 502 may be determined such that virtual viewer position 502 may be define, for example, depth 542, D, and a lateral virtual viewer position, $C_i$. In the example of FIG. 5, two virtual viewer positions 504, 503 ($C_0$ and $C_1$) both at depth 542, D, are illustrated for the sake of clarity of presentation. The corresponding techniques discussed with respect to virtual viewer positions 504, 503 may be implemented for any virtual viewer position 502, $C_i$, illustrated along the horizontal axis and depth 542, D, illustrated along the vertical axis.

First, with reference to virtual viewer position 503, $C_1$, a corresponding planar image 506 is attained as discussed herein with respect to planar image 215 and synthesized planar image 214. For example, planar image 506 may be image data from a camera (if virtual viewer position 503, $C_1$, is at a camera position) or synthesized image data (if virtual viewer position 503, $C_1$, is not at a camera position) or any other planar image data (e.g., graphics rendered data, preprocessed image data, etc.). As shown, planar image 506 has a focal length 505, f, from virtual viewer position 503, $C_1$, (e.g., the focal length of the camera or virtual camera) and a width, W, defined in pixels, that extends from a first (left) edge 507 (e.g., a zero (0) position) to a second (right) edge 508 (e.g., a W position where W is the width of planar image 506). Notably, planar image 506 is aligned with virtual viewer position 503, $C_1$, at a position W/2 such that W/2 is a midpoint of planar image 506. As used herein, the term midpoint is relative to the dimension being addressed such that the midpoint of planar image 506 is a lateral midpoint in FIG. 5 but need not be a vertical midpoint. In examples where the discussed techniques are performed in a vertical manner, the midpoint would be a vertical midpoint, but not necessarily a lateral midpoint. As shown, planar image 506 is centered laterally with respect to virtual viewer position 503, $C_1$ such that a line from virtual viewer position 503, $C_1$, through the midpoint of planar image 506 is orthogonal to virtual window 531. Notably, if planar image 506 (or a scaled version thereof) were presented to a user, the symmetric frustum thereof would provide an unnatural view as discussed herein.

As shown, an asymmetric frustum 540 is defined between virtual window 531 and a cropped virtual image 541 such that asymmetric frustum 540 that extends from a first (left) crop position 510, $X_{L1}$, to a second (right) crop position 511, $X_{R1}$. In the following discussion, planar image 506 (e.g., a full size image) is cropped to cropped virtual image 541 for presentation to a user in a display region such that cropped virtual image 541 fills the display region to provide an immersive view of a scene as discussed herein.

For example, using similar triangles, the following Equations (1) and (2) may be established:

$$\frac{C_i}{D} = \frac{\frac{W}{2} - X_{Li}}{f} \quad (1)$$

$$\frac{S - C_i}{D} = \frac{X_{Ri} - \frac{W}{2}}{f} \quad (2)$$

where Ci is a lateral virtual viewer position 502 defined as a lateral position of the virtual viewer position away from a first (left) edge of virtual window 531, D is the depth of virtual viewer position 502 from virtual window 531, W is the width (in pixels) of the planar image (e.g., planar image 506), $X_{Li}$ is the first (left) crop position (e.g., first (left) crop position 510), f is the focal length (e.g., focal length 505) of the planar image (e.g., planar image 506), S is the width of the virtual window (e.g., virtual window width 533), and $X_{Ri}$ is the second (right) crop position (e.g., second (right) crop position 511).

Figure 6:
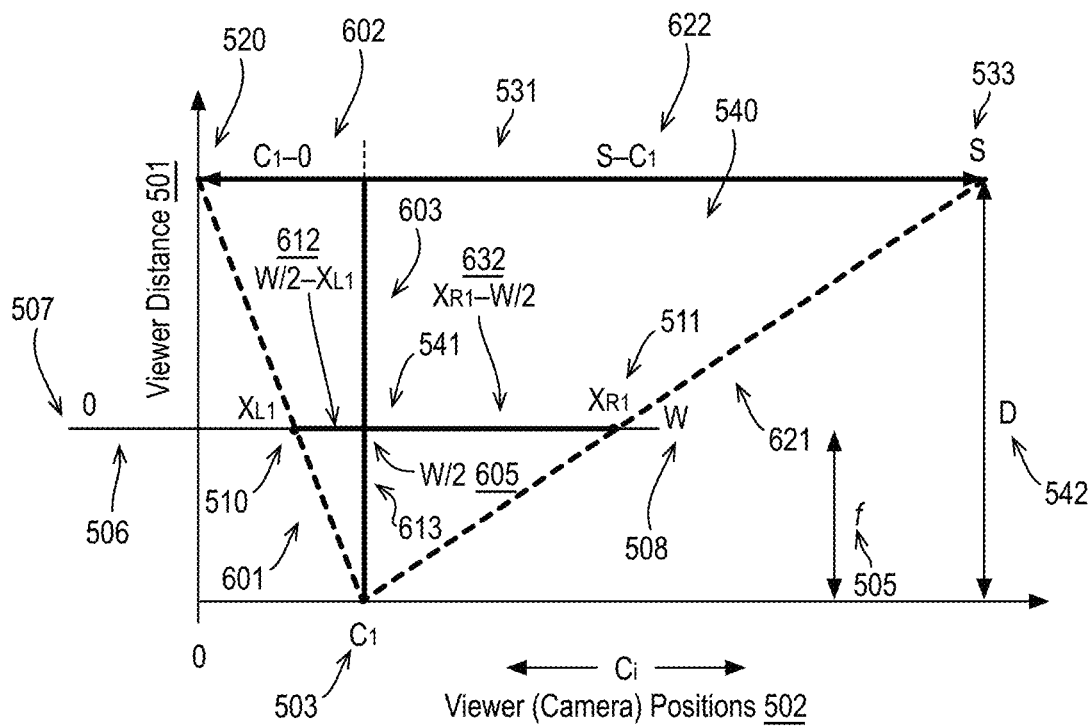
FIG. 6 illustrates example similar triangles for a virtual viewer position.

FIG. 6 illustrates example similar triangles 601, 621 for a virtual viewer position, arranged in accordance with at least some implementations of the present disclosure. FIG. 6 represents the same context of FIG. 5 with viewer position 504 and corresponding components removed for the sake of clarity of presentation.

As shown in FIG. 6, first similar triangles 601 are defined relative to first (left) crop position 510 such that the larger triangle of first similar triangles 601 has a first leg 602 that is $C_1$–0 (e.g., a lateral position of virtual viewer position 503, $C_1$, from first (left) edge 520), and a second leg 603 that is depth 542, D (e.g., a depth of virtual viewer position 503, $C_1$, from virtual window 531). The smaller triangle of first similar triangles 601 has a first leg 612 that is W/2–$X_{L1}$ (e.g., a position away from midpoint 605 of planar image 506 toward first (left) edge 507 of planar image 506 by $X_{L1}$), and a second leg 613 that is focal length 505, f (e.g., a focal length of planar image 506). Using such similar triangles, the ratios of Equation (1) are defined by first legs 602, 612 over second legs 603, 613, respectively.

Furthermore, second similar triangles 621 are defined relative to second (right) crop position 511 such that the larger triangle of second similar triangles 621 has a first leg 622 that is S–$C_1$ (e.g., a difference between virtual window width 533, S, and lateral position of virtual viewer position 503, $C_1$, from first (left) edge 520), and second leg 603 that is depth 542, D (e.g., a depth of virtual viewer position 503, C₁, from virtual window 531). The smaller triangle of second similar triangles 621 has a first leg 632 that is $X_{R1}-W/2$ (e.g., a position away from midpoint 605 of planar image 506 toward second (right) edge 508 of planar image 506 by $X_{R1}$), and second leg 613 that is focal length 505, f (e.g., a focal length of planar image 506). Using such similar triangles, the ratios of Equation (2) are defined by first legs 622, 632 over second legs 603, 613, respectively.

As discussed, it is desirable to determine first (left) crop position 510, $X_{L1}$, and second (right) crop position 511, $X_{R1}$, to crop planar image 506 to cropped virtual image 541 for presentation. Equations (1) and (2) are solved for first (left) crop position 510, $X_{L1}$, and second (right) crop position 511, $X_{R0}$, to define asymmetric frustum 540 as shown in Equations (3) and (4):

$$X_{Li} = \frac{W}{2} - \frac{fC_i}{D} \quad (3)$$

$$X_{Ri} = \frac{W}{2} + \frac{f(S - C_i)}{D} \quad (4)$$

where $X_{Li}$ is the first (left) crop position (e.g., first (left) crop position 510) and $X_{Ri}$ is the second (right) crop position (e.g., second (right) crop position 511). As shown in Equation (3), the first (left) crop position (e.g., first (left) crop position 510) is at a position away from a midpoint of the planar image (W/2) toward a first edge of the planar image (as defined by subtracting $f \times C_i/D$) by a ratio of a product of a focal length (f) corresponding to the planar image and a lateral position of the virtual viewer position away from a first edge of the virtual window ($C_i$) corresponding to the first edge of the first planar image to a distance or depth (D) of a virtual viewer position from the virtual window. As shown in Equation (4), the second crop position (e.g., second (right) crop position 511) is at a position away from the midpoint of the planar image toward a second edge of the planar image opposite the first edge (as defined by adding $f \times (S - C_i)/D$) by a ratio of a product of a focal length (f) and a difference between a width of the virtual window (S) and the lateral position of the virtual viewer from the first edge of the virtual window ($C_i$) to the distance or depth (D).

As discussed, first (left) crop position 510, $X_{L1}$, and second (right) crop position 511, $X_{R1}$, are used to crop planar image 506 such that the resultant image, cropped virtual image 541, is provided for presentation in display region 132.

Figure 7:
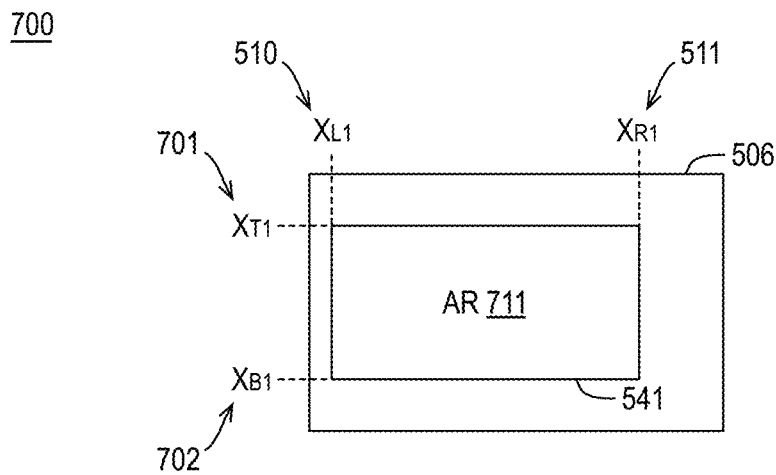
FIG. 7 illustrates an example cropping of an example planar image to an example cropped virtual image.

FIG. 7 illustrates an example cropping 700 of an example planar image 506 to an example cropped virtual image 541, arranged in accordance with at least some implementations of the present disclosure. As shown in FIG. 7, planar image 506 may be received for processing. Although illustrated with respect to planar image 506 and cropped virtual image 541, cropping 700 may be performed on any planar image discussed herein to generate any cropped virtual image discussed herein. As shown, first (left) crop position 510, $X_{L1}$, and second (right) crop position 511, $X_{R1}$, define left and right crop positions to crop planar image 506 in a lateral dimension (e.g., an x-direction). Third (top) crop position 701, $X_{T1}$, and fourth (bottom) crop position 702, $X_{B1}$, define top and bottom crop positions to crop planar image 506 in a vertical dimension (e.g., a y-direction). Third (top) crop position 701, $X_{T1}$, and fourth (bottom) crop position 702, $X_{B1}$, may be generated using any suitable technique or techniques. In an embodiment, third (top) crop position 701, $X_{T1}$, and fourth (bottom) crop position 702, $X_{B1}$, are determined to maintain an aspect ratio (AR) 711 such that aspect ratio 711 matches an aspect ratio of one or more of planar image 506, display region 132, or display 102. In an embodiment, aspect ratio 711 is a predefined value. Such maintenance of aspect ratio 711 may avoid stretching artifacts. Based on first (left) crop position 510, $X_{L1}$, second (right) crop position 511, $X_{R1}$, third (top) crop position 701, $X_{T1}$, and fourth (bottom) crop position 702, $X_{B1}$, planar image 506 is cropped to cropped virtual image 541. The resultant cropped virtual image 541 is presented to a user via display region 132.

Returning now to FIG. 5, with reference to virtual viewer position 504, $C_0$, a corresponding planar image 513 is attained as discussed herein with respect to planar image 215 and synthesized planar image 214. As shown, planar image 513 has focal length 505, f, from virtual viewer position 504, $C_0$, and a width, W, defined in pixels, that extends from a first (left) edge 514 (e.g., a zero (0) position) to a second (right) edge 515 (e.g., a W position where W is the width of planar image 506). Notably, planar images 506, 513 may have the same widths and focal lengths. In the illustration of FIG. 5, planar images 506, 513 are shown offset slightly in depth merely for the sake of clarity of presentation. Planar image 513 is aligned with virtual viewer position 504, $C_0$, at W/2 such that W/2 is a midpoint of planar image 506 and a line from virtual viewer position 504, $C_0$, through the midpoint of planar image 506 is orthogonal to virtual window 531.

As shown, an asymmetric frustum 545 is defined between virtual window 531 and a cropped virtual image 546 such that asymmetric frustum 545 extends from a first (left) crop position 516, $X_{L0}$, to a second (right) crop position 517, $X_{R0}$. As discussed, planar image 513 (e.g., a full size image) is cropped to cropped virtual image 546 for presentation to a user in a display region such that cropped virtual image 541 fills the display region to provide an immersive view of a scene as discussed herein.

Figure 8:
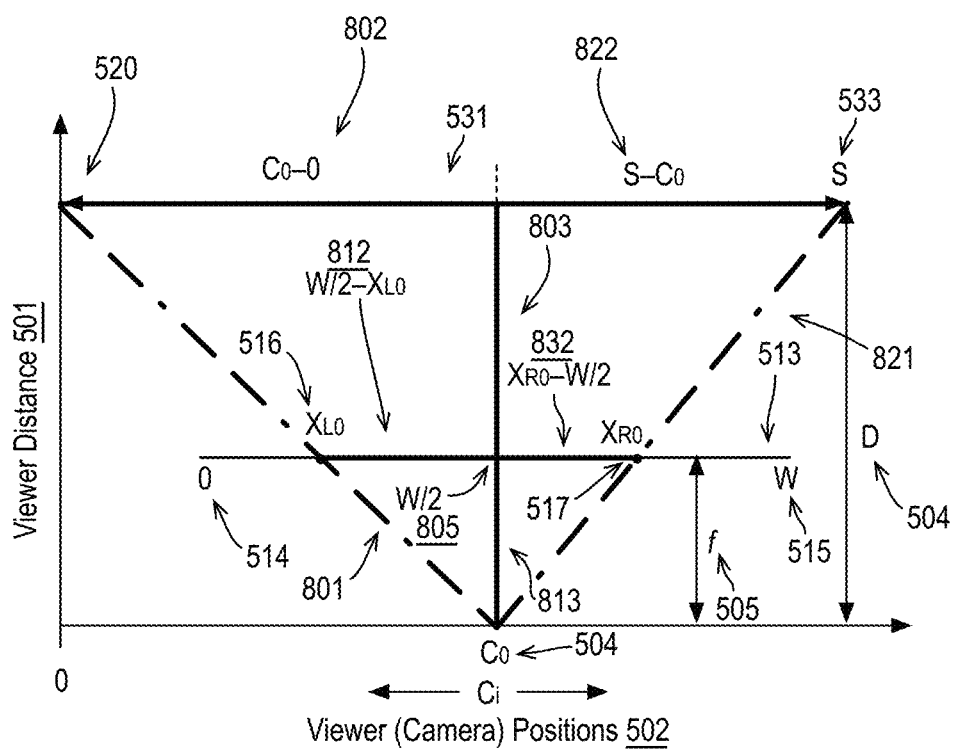
FIG. 8 illustrates example similar triangles for another virtual viewer position.

FIG. 8 illustrates example similar triangles 801, 821 for another virtual viewer position, arranged in accordance with at least some implementations of the present disclosure. FIG. 8 represents the same context of FIG. 5 with virtual viewer position 503 and corresponding components removed for the sake of clarity of presentation. As shown in FIG. 8, first similar triangles 801 are defined relative to first (left) crop position 516 such that the larger triangle of first similar triangles 801 has a first leg 802 that is $C_0-0$ (e.g., a lateral position of virtual viewer position 504, $C_0$, from first (left) edge 520), and a second leg 803 that is depth 542, D (e.g., a depth of virtual viewer position 504, $C_0$, from virtual window 531). The smaller triangle of first similar triangles 801 has a first leg 812 that is $W/2-X_{L0}$ (e.g., a position away from midpoint 805 of planar image 513 toward first (left) edge 514 of planar image 513 by $X_{L0}$), and a second leg 813 that is focal length 505, f (e.g., a focal length of planar image 513).

Second similar triangles 821 are defined relative to second (right) crop position 517 such that the larger triangle of second similar triangles 821 has a first leg 822 that is $S-C_0$ (e.g., a difference between virtual window width 533, S, and lateral position of virtual viewer position 504, $C_0$, from first (left) edge 520), and second leg 803 that is depth 542, D (e.g., a depth of virtual viewer position 504, $C_0$, from virtual window 531). The smaller triangle of second similar triangles 821 has a first leg 832 that is $X_{R0}-W/2$ (e.g., a position away from midpoint 805 of planar image 513 toward second (right) edge 515 of planar image 513 by $X_{R0}$), and second leg 813 that is focal length 505, f (e.g., a focal length of planar image 506).

Again with reference to Equations (3) and (4), such similar triangles may be used to determine first (left) crop position 516, $X_{L0}$, and second (right) crop position 517, $X_{R0}$, such that first (left) crop position 516, $X_{L0}$, is at a position away from a midpoint of planar image 513 (W/2) toward first (left) edge 514 of planar image 513 (as defined by subtracting f×$C_i$/D) by a ratio of focal length 505, f, corresponding to planar image 513 and depth 542, D, of virtual viewer position 504 from virtual window 531 multiplied by a lateral position of virtual viewer position 504, $C_0$, away from first (left) edge 520 of virtual window 531, which corresponds to first (left) edge 514 of planar image 513 and such that second (right) crop position 517, $X_{R0}$, is at a position away from the midpoint of planar image 513 (W/2) toward second (right) edge 515 of planar image 513 opposite first (left) edge 514 of planar image 513 (as defined by adding f×(S–$C_i$)/D) by the ratio of focal length 505, f, and depth 542, D, multiplied by a difference between virtual window width 533, S, and the lateral position of lateral position of virtual viewer position 504, $C_0$, away from first (left) edge 520 of virtual window 531.

First (left) crop position 516, $X_{L0}$, and second (right) crop position 517, $X_{R0}$, are used to crop planar image 513 to cropped virtual image 546 using any suitable technique or techniques such as those discussed with respect to FIG. 7.

The examples illustrated in FIGS. 5, 6, and 8 provide examples where virtual viewer positions 503, 504 are between edges 520, 521 of virtual window 531. Discussion now turns to an example where a virtual viewer position 901 is outside of one of edges 520, 521 of virtual window 531.

Figure 9:
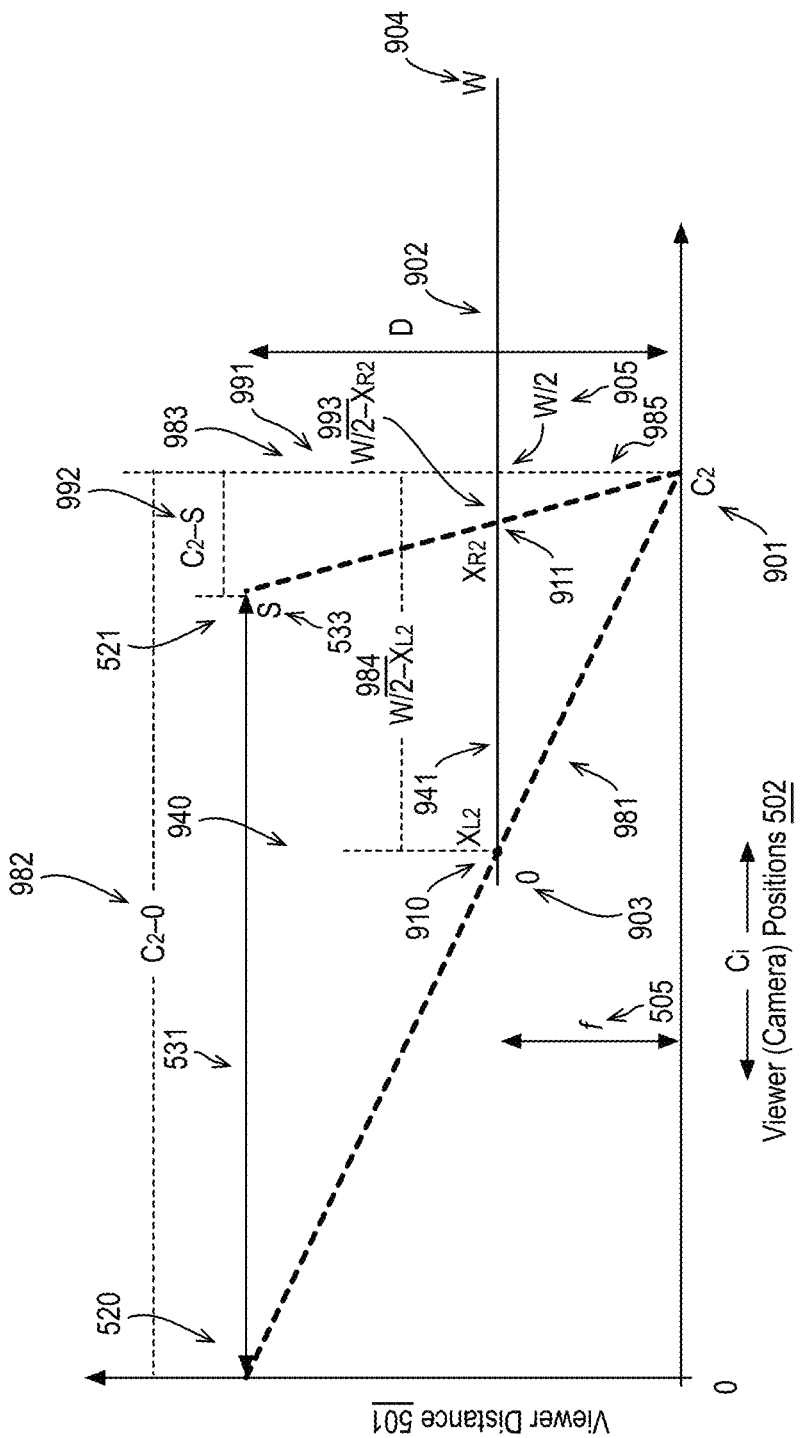
FIG. 9 illustrates an example virtual viewer position outside of an edge of an example virtual window and corresponding example crop positions.

FIG. 9 illustrates example virtual viewer position 901 outside of an edge 521 of an example virtual window 531 and corresponding example crop positions, arranged in accordance with at least some implementations of the present disclosure. In FIG. 9, like components with respect to FIG. 5 are illustrated with like numerals.

As shown, virtual viewer position 901, $C_2$, is laterally outside of second (right) edge 521 of virtual window 531. For virtual viewer position 901, $C_2$, a corresponding planar image 902 is attained as discussed herein with respect to planar image 215 and synthesized planar image 214. As shown, planar image 902 has a focal length 505, f, from virtual viewer position 901, $C_2$, and a width, W, defined in pixels, that extends from a first (left) edge 903 (e.g., a zero (0) position) to a second (right) edge 904 (e.g., a W position where W is the width of planar image 902). Planar image 902 is aligned with virtual viewer position 901, $C_2$, at a midpoint 905 position W/2. That is, planar image 902 is centered laterally with respect to virtual viewer position 901, $C_2$, such that a line from virtual viewer position 901, $C_2$, through midpoint 905 of planar image 902 is orthogonal to the plane extending from virtual window 531.

As shown, an asymmetric frustum 940 is defined between virtual window 531 and a cropped virtual image 941 such that asymmetric frustum 940 that extends from a first (left) crop position 910, $X_{L2}$, to a second (right) crop position 911, $X_{R2}$. As discussed, planar image 902 (e.g., a full size image) is to be cropped to cropped virtual image 941 for presentation to a user in a display region such that cropped virtual image 541 fills the display region to provide an immersive view of a scene. As shown, first similar triangles 981 are defined relative to first (left) crop position 910 such that the larger triangle of first similar triangles 981 has a first leg 982 that is $C_2$–0 (e.g., a lateral position of virtual viewer position 901, $C_2$, from first (left) edge 520) and a second leg 983 that is depth 542, D (e.g., a depth of virtual viewer position 901, $C_2$, from a plane extending from virtual window 531). The smaller triangle of first similar triangles 981 has a first leg 984 that is W/2–$X_{L2}$ (e.g., a position away from midpoint 905 of planar image 902 toward first (left) edge 903 of planar image 902 by $X_{L2}$), and a second leg 985 that is focal length 505, f (e.g., a focal length of planar image 902).

Second similar triangles 991 are defined relative to second (right) crop position 911 such that the larger triangle of second similar triangles 991 has a first leg 992 that is $C_2$–S (e.g., a difference between lateral position of virtual viewer position 901, $C_2$, from first (left) edge 520 and virtual window width 533, S), and second leg 983 that is depth 542, D (e.g., a depth of virtual viewer position 504, $C_0$, from virtual window 531). The smaller triangle of second similar triangles 991 has a first leg 993 that is W/2–$X_{R2}$ (e.g., a position away from midpoint 905 of planar image 902 toward second (right) edge 904 of planar image 902 by $X_{R2}$), and second leg 985 that is focal length 505, f (e.g., a focal length of planar image 506).

Again with reference to Equations (3) and (4), such similar triangles may be used to determine first (left) crop position 910, $X_{L2}$, and second (right) crop position 911, $X_{R2}$, such that first (left) crop position 910, $X_{L2}$, is at a position away from a midpoint of planar image 902 (W/2) toward first (left) edge 903 of planar image 902 (as defined by subtracting f×$C_i$/D) by a ratio of focal length 505, f, corresponding to planar image 902 and depth 542, D, of virtual viewer position 901 from a plane extended from virtual window 531 multiplied by a lateral position of virtual viewer position 901, $C_2$, away from first (left) edge 520 of virtual window 531, which corresponds to first (left) edge 903 of planar image 902. Notably, when virtual viewer position 901, $C_2$, is laterally outside of second (right) edge 521 of virtual window 531, Equation (3) is still used to determine first (left) crop position 910, $X_{L2}$.

To determine second (right) crop position 911, $X_{L2}$, Equation (4) is modified by changing the sign on the right side of the equation from a plus to a minus (i.e., XRi=W/2–f×(S–$C_i$)/D) such that second (right) crop position 911, $X_{R2}$, is at a position away from the midpoint of planar image 902 (W/2) toward first (left) edge 903 of planar image 902 (as defined by subtracting f×(S–$C_i$)/D instead of adding) by the ratio of focal length 505, f, and depth 542, D, multiplied by a difference between virtual window width 533, S, and the lateral position of lateral position of virtual viewer position 901, $C_2$, away from first (left) edge 520 of virtual window 531. Similarly, when a virtual viewer position is laterally outside of first (left) edge 520 of virtual window 531, Equation (4) may be applied unchanged to determine the second (right) crop position, $X_{R1}$, and equation (3) may be modified by changing the sign (e.g., adding f×$C_i$/D instead of subtracting).

The resultant first (left) crop position, $X_{Li}$, and second (right) crop position, $X_{R1}$, are used to crop planar image 902 to cropped virtual image 941 using any suitable technique or techniques such as those discussed with respect to FIG. 7. Notably, with reference to FIGS. 6 and 9, for a first virtual viewer position (e.g., virtual viewer positions 503) that is between first and second edges (e.g., first (left) edge 520 and second (right) edge 521) of the virtual window (e.g., virtual window 531), the first and second crop positions (e.g., first (left) crop position 510 and second (right) crop position 511) are on opposite sides of a midpoint (e.g., midpoint 605) of the planar image (e.g., planar image 506). In contrast, for a second virtual viewer position (e.g., virtual viewer position 901) that is outside one of the first and second edges (e.g., first (left) edge 520 and second (right) edge 521) of the virtual window (e.g., virtual window 531), the first and second crop positions (e.g., first (left) crop position 910 and second (right) crop position 911) are on the same side of a midpoint of the planar image (e.g., planar image 902).

Figure 10A:
FIGS. 10A and 10B illustrate an example synthesized planar image and an example cropped virtual image 122, respectively.
Figure 10B:

FIGS. 10A and 10B illustrate an example synthesized planar image 214 and an example cropped virtual image 122, respectively, arranged in accordance with at least some implementations of the present disclosure. In FIG. 10A, synthesized planar image 214 shows an example image of a scene that has been synthesized from two adjacent (e.g., left and right) captured images of the scene. As discussed, any number of images of a scene may be attained. If an image corresponds to a virtual viewer position, the image may be used. If, however, if no image corresponds to the virtual viewer position, the image may be synthesized.

FIG. 10B illustrates cropped virtual image 122 cropped from synthesized planar image 214 as discussed herein. In the example, cropped virtual image 122, a 50 cm wide virtual window was provided at a depth of 80 cm from the virtual viewer position. However, any suitable dimensions may be used. As discussed, cropped virtual image 122 is provided by generating an asymmetric frustum horizontally (e.g., as defined by Equations (1), (2), (3), and (4)) and cropping the planar image horizontally based on the generated asymmetric frustum and vertically to maintain the aspect ratio of the image to avoid any stretching artifacts. The generation of a virtual window (and cropped virtual image 122) is visually appealing since the viewer is able to observe parallax (e.g., view areas occluded by the foreground objects as they move their head) and the asymmetric frustum renders a view which mimics what the user would have seen through a real window of the specified width at the specified distance. The techniques discussed herein align objects at a distance, D, in the scene to appear at the plane of the window and stationary to the viewer as they move their head. In some embodiments, objects that are closer to the camera than the distance, D, may not appear correctly (e.g., due to reversed disparity), but such artifacts are not very obvious to human viewers. Furthermore, such issues may be avoided by setting up the scene to avoid this issue.

The techniques discussed herein provide an immersive visual experience using an array of planar images (e.g., attained from a planar array of cameras recording a given scene). Such techniques may be implemented in real time (e.g., at 30 frames per second at 1920×1080 resolution) using standard processing environments. Notably, when people view a natural environment or another person face to face, they move their head and see the environment from a different perspective. While photographs can capture a moment in real life, they do not create a similar immersive experience since the user is limited to a single camera view. This disadvantage is especially evident in human interactions where a person is providing instructions, making hand gestures or showing an object to the viewer. The techniques discussed herein overcome such shortcomings.

Figure 11:
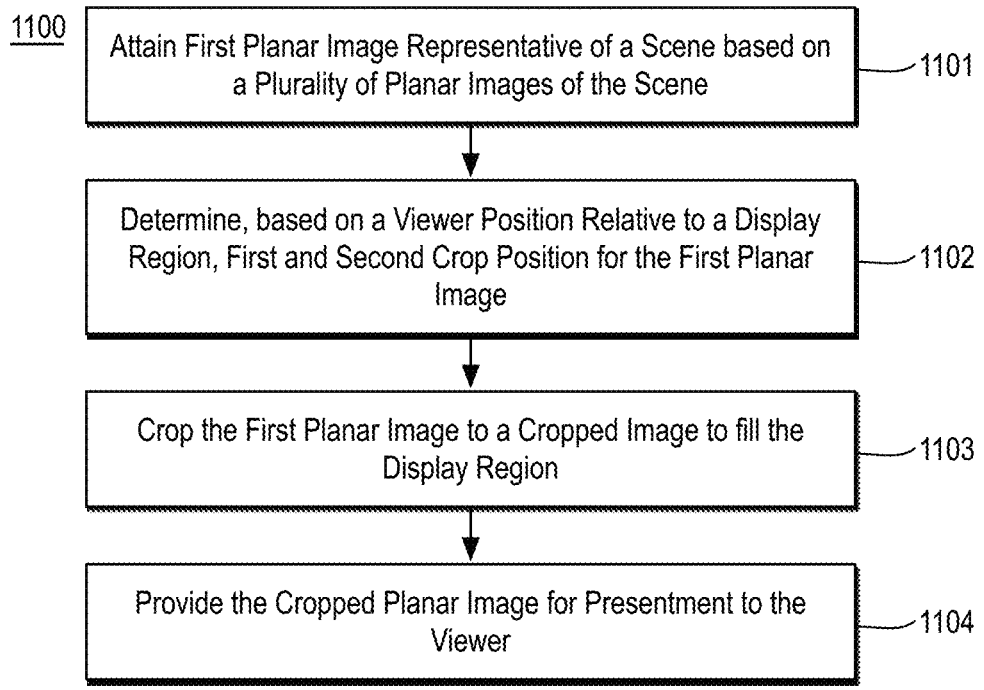
FIG. 11 is a flow diagram illustrating an example process for generating a virtual view from multi-view images.

FIG. 11 is a flow diagram illustrating an example process 1100 for generating a virtual view from multi-view images, arranged in accordance with at least some implementations of the present disclosure. Process 1100 may include one or more operations 1101-1104 as illustrated in FIG. 11. Process 1100 may form at least part of a virtual view generation process. By way of non-limiting example, process 1100 may form at least part of a temporal noise reduction as performed by device 200 as discussed herein. Furthermore, process 1100 will be described herein with reference to system 1200 of FIG. 12.

Figure 12:
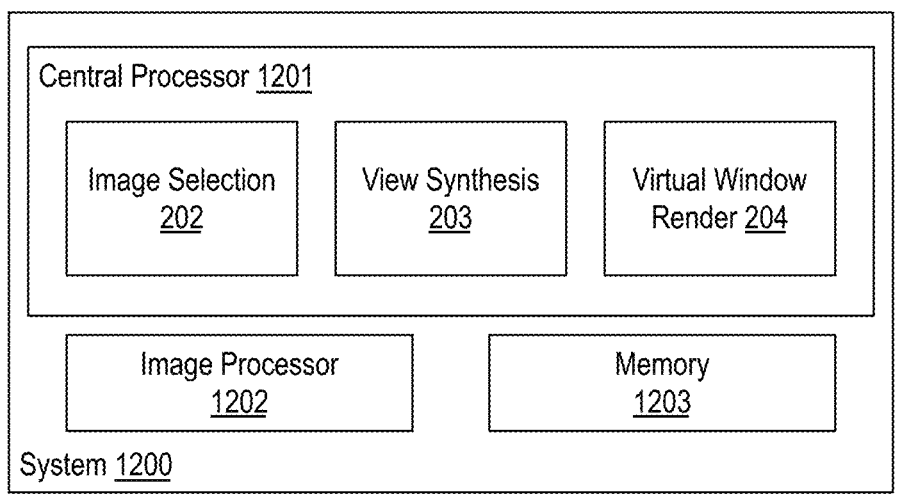
FIG. 12 is an illustrative diagram of an example system for generating a virtual view from multi-view images.

FIG. 12 is an illustrative diagram of an example system 1200 for generating a virtual view from multi-view images, arranged in accordance with at least some implementations of the present disclosure. As shown in FIG. 12, system 1200 may include a central processor 1201, an image processor 1202, and a memory 1203 Also as shown, central processor 1201 may include or implement image selection module 202, view synthesis module 203, and virtual window render module 204. In the example of system 1200, memory 1203 may store image data, video frame data, noise reduction image data, reference image data, detail level data, content level data, local motion data, motion information data, noise stream data, equalized noise stream data, parameters, thresholds, or any other data discussed herein.

As shown, in some examples, one or more or portions of image selection module 202, view synthesis module 203, and virtual window render module 204 are implemented via central processor 1201. In other examples, one or more or portions of one or more or portions of image selection module 202, view synthesis module 203, and virtual window render module 204 are implemented via image processor 1202, an image processing unit, an image processing pipeline, an image signal processor, or the like. In some examples, one or more or portions of image selection module 202, view synthesis module 203, and virtual window render module 204 are implemented in hardware as a system-on-a-chip (SoC).

Image processor 1202 may include any number and type of image or graphics processing units that may provide the operations as discussed herein. Such operations may be implemented via software or hardware or a combination thereof. For example, image processor 1202 may include circuitry dedicated to manipulate and/or analyze images obtained from memory 1203. Central processor 1201 may include any number and type of processing units or modules that may provide control and other high level functions for system 1200 and/or provide any operations as discussed herein. Memory 1203 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1203 may be implemented by cache memory. In an embodiment, one or more or portions of image selection module 202, view synthesis module 203, and virtual window render module 204 are implemented via an execution unit (EU) of image processor 1202. The EU may include, for example, programmable logic or circuitry such as a logic core or cores that may provide a wide array of programmable logic functions. In an embodiment, one or more or portions of image selection module 202, view synthesis module 203, and virtual window render module 204 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 11, process 1100 may begin at operation 1101, where a first planar image representative of a scene is attained based on multiple planar images of the scene. The first planar image may be attained using any suitable technique or techniques. In an embodiment, the plurality of planar images are images captured via an array of cameras. In an embodiment, a viewer position relative to a display region translates to an image capture position of one of the array of cameras and the first planar image comprises a corresponding one of the multiple captured planar images. In an embodiment, the viewer position translates to a position between first and second cameras of the array of cameras, and attaining the first planar image includes synthesizing the first planar image between a second planar image and a third planar image corresponding to the first and second cameras, respectively, by generating bi-directional disparity maps based on the second and third planar images and warping the second and third planar images to the first planar image based on the bi-directional disparity maps.

Processing continues at operation 1102, where a first crop position of the first planar image and a second crop position of the first planar image are determined based on a viewer position relative to a display region. For example, an eventual cropped planar image may be presented to the viewer (who is at the viewer position) on the display region (e.g., of a display). The first and second crop positions may be determined using any suitable technique or techniques. In an embodiment, the first and second crop positions define an asymmetric frustum between the cropped planar image and a virtual window corresponding to the display region. In an embodiment, the first and second crop positions define an asymmetric frustum of the first planar image corresponding to a virtual window representing the display region.

In an embodiment, the first crop position is at a position away from a midpoint of the first planar image toward a first edge of the first planar image by a ratio of a product of a focal length corresponding to the first planar image and a lateral position of virtual viewer position from the first edge of the virtual window to a distance of the virtual viewer position from the virtual window, wherein the virtual viewer position corresponds to the viewer position. In an embodiment, the first crop position is at a position away from a midpoint of the first planar image toward a first edge of the first planar image by a ratio of a focal length corresponding to the first planar image and a depth of a virtual viewer position from the virtual window multiplied by a lateral position of the virtual viewer position away from a first edge of the virtual window corresponding to the first edge of the first planar image, wherein the virtual viewer position corresponds to the viewer position. For example, the virtual viewer position may be a position in the image capture coordinate system that is translated from the viewer position relative to the display region. The first edge of the first planar image and the first edge of the virtual window may be any suitable corresponding edges such as top, bottom, left, or right edges.

In an embodiment, the second crop position is at a second position away from the midpoint of the first planar image toward a second edge of the first planar image by a ratio of a product of the focal length and a difference between the width of the virtual window and the lateral position of the virtual viewer position from the first edge of the virtual window to the distance of the user from the virtual window. In an embodiment, the second crop position is at a second position away from the midpoint of the first planar image toward a second edge of the first planar image opposite the first edge by the ratio of the focal length and the depth multiplied by a difference between a width of the virtual window and the lateral position of the virtual viewer position from the first edge of the virtual window. In an embodiment, the second crop position is at a position away from the midpoint of the first planar image toward the first edge of the first planar image by a ratio of a product of the focal length and a difference between the lateral position of the virtual viewer position from the first edge of the virtual window and a width of the virtual window to the distance of the virtual viewer position from the virtual window. In an embodiment, the second crop position is at a position moved from the midpoint of the first planar image toward the first edge of the first planar image by the ratio of the focal length and the depth multiplied by a difference between the lateral position of the viewer from the first edge of the virtual window and a width of the virtual window. In an embodiment, process 1100 further includes attaining, after a viewer move to a second viewer position, a second planar image representative of the scene based on second multiple planar images of the scene and determining, based on the second viewer position relative to the display region, a third crop position of the second planar image and a fourth crop position of the second planar image opposite the first crop position, such that a first virtual viewer position corresponding to the viewer position is between first and second edges of the virtual window and a second virtual viewer position corresponding to the second viewer position is outside one of the first and second edges of the virtual window and wherein the first and second crop positions are on opposite sides of a midpoint of the first planar image and the third and fourth crop positions are on the same side of a midpoint of the second planar image.

Processing continues at operation 1103, where the first planar image is cropped to a cropped planar image to fill the display region based on the first and second crop positions, such that the first and second crop positions define an asymmetric frustum of the first planar image corresponding to a virtual window representing the display region.

Processing continues at operation 1104, where the cropped planar image is provided for presentation to the viewer. The cropped planar image may be provided for presentation using any suitable technique or techniques. In an embodiment, providing the cropped planar image for presentation to the viewer includes transmitting the cropped planar image to a receiving device having a display screen comprising the display region. In an embodiment, providing the cropped planar image for presentation to the viewer includes transmitting the cropped planar image to a display screen including the display region.

Process 1100 may be repeated any number of times either in series or in parallel for any number of images, image frames, video frames, or the like. As discussed, process 1100 may provide for cropped images, views, image frames, video frames, etc. that correspond to a virtual window into a scene.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 13:
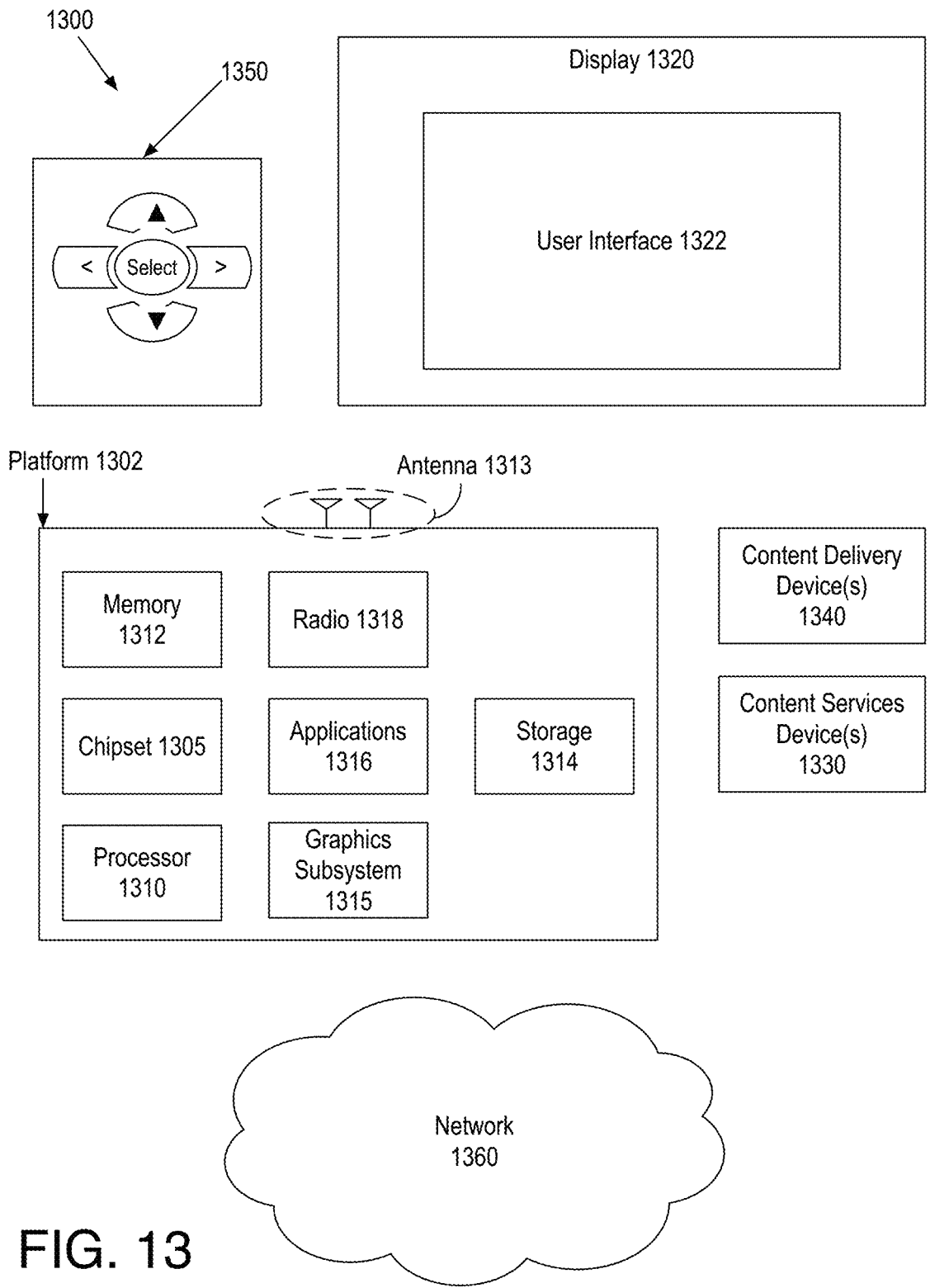
FIG. 13 is an illustrative diagram of an example system.

FIG. 13 is an illustrative diagram of an example system 1300, arranged in accordance with at least some implementations of the present disclosure. In various implementations, system 1300 may be a mobile device system although system 1300 is not limited to this context. For example, system 1300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), a surveillance camera, a surveillance system including a camera, and so forth.

In various implementations, system 1300 includes a platform 1302 coupled to a display 1320. Platform 1302 may receive content from a content device such as content services device(s) 1330 or content delivery device(s) 1340 or other content sources such as image sensors 1319. For example, platform 1302 may receive image data as discussed herein from image sensors 1319 or any other content source. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1312, antenna 1313, storage 1314, graphics subsystem 1315, applications 1316, image signal processor 1317 and/or radio 1318. Chipset 1305 may provide intercommunication among processor 1310, memory 1312, storage 1314, graphics subsystem 1315, applications 1316, image signal processor 1317 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1310 may be dual-core processor(s), dual-core mobile processor(s), and so forth.

Memory 1312may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Image signal processor 1317 may be implemented as a specialized digital signal processor or the like used for image processing. In some examples, image signal processor 1317 may be implemented based on a single instruction multiple data or multiple instruction multiple data architecture or the like. In some examples, image signal processor 1317 may be characterized as a media processor. As discussed herein, image signal processor 1317 may be implemented based on a system on a chip architecture and/or based on a multi-core architecture.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, DisplayPort, wireless HDMI, and/or wireless HD compliant techniques. Graphics subsystem 1315 may be integrated into processor 1310 or chipset 1305. In some implementations, graphics subsystem 1315 may be a stand-alone device communicatively coupled to chipset 1305.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

Image sensors 1319 may include any suitable image sensors that may provide image data based on a scene. For example, image sensors 1319 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1319 may include any device that may detect information of a scene to generate image data.

In various implementations, content services device(s) 1330 may include a cable television box, personal computer, network, telephone, Internet enabled devices or appliance capable of delivering digital information and/or content, and any other similar device capable of uni-directionally or bi-directionally communicating content between content providers and platform 1302 and/or display 1320, via network 1360 or directly. It will be appreciated that the content may be communicated uni-directionally and/or bi-directionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of navigation controller 1350 may be used to interact with user interface 1322, for example. In various embodiments, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1350 may be replicated on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In various embodiments, navigation controller 1350 may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various embodiments, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various embodiments, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Figure 14:
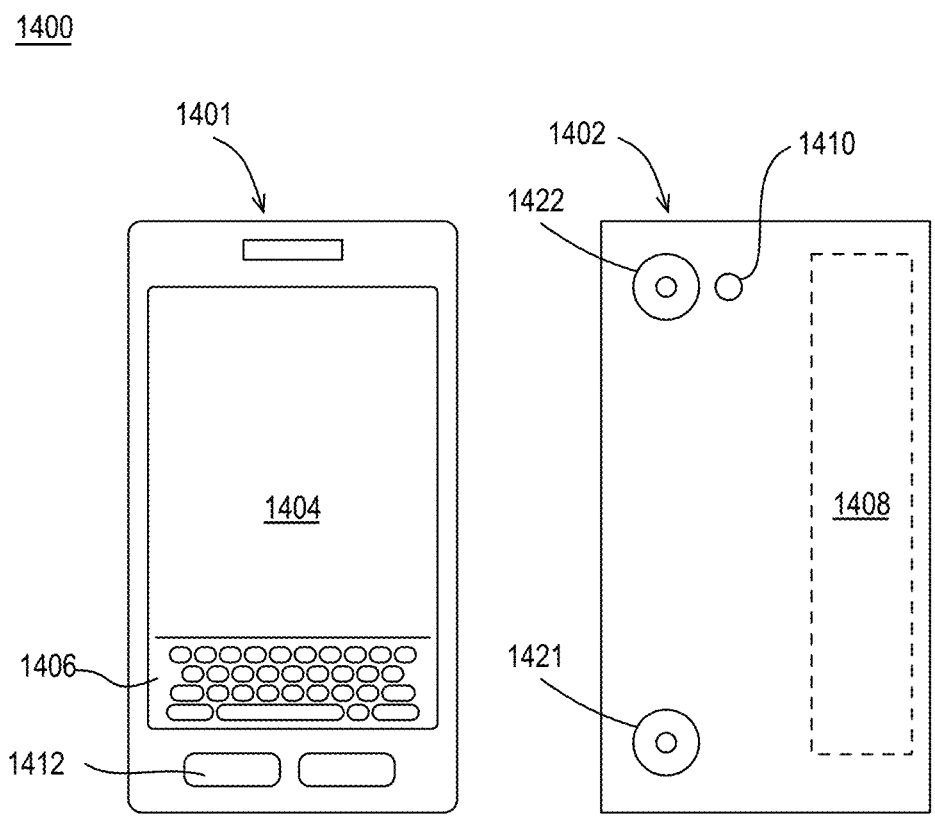
FIG. 14 illustrates an example device, all arranged in accordance with at least some implementations of the present disclosure.

As described above, system 1300 may be embodied in varying physical styles or form factors. FIG. 14 illustrates an example small form factor device 1400, arranged in accordance with at least some implementations of the present disclosure. In some examples, system 1300 may be implemented via device 1400. In other examples, other systems, components, or modules discussed herein or portions thereof may be implemented via device 1400. In various embodiments, for example, device 1400 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 14, device 1400 may include a housing with a front 1401 and a back 1402. Device 1400 includes a display 1404, an input/output (I/O) device 1406, a color camera 1421, a color camera 1422, an infrared transmitter 1423, and an integrated antenna 1408. In some embodiments, color camera 1421 and color camera 1422 attain planar images as discussed herein. In some embodiments, device 1400 does not include color camera 1421 and 1422 and device 1400 attains input image data (e.g., any input image data discussed herein) from another device. Device 1400 also may include navigation features 1412. I/O device 1406 may include any suitable I/O device for entering information into a mobile computing device. Examples for I/O device 1406 may include an alphanumeric keyboard, a numeric keypad, a touch pad, input keys, buttons, switches, microphones, speakers, voice recognition device and software, and so forth. Information also may be entered into device 1400 by way of microphone (not shown), or may be digitized by a voice recognition device. As shown, device 1400 may include color cameras 1421, 1422, and a flash 1410 integrated into back 1402 (or elsewhere) of device 1400. In other examples, color cameras 1421, 1422, and flash 1410 may be integrated into front 1401 of device 1400 or both front and back sets of cameras may be provided. Color cameras 1421, 1422 and a flash 1410 may be components of a camera module to originate color image data with IR texture correction that may be processed into an image or streaming video that is output to display 1404 and/or communicated remotely from device 1400 via antenna 1408 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for generating a virtual view from multi-view images comprising:
   a memory to store a plurality of planar images of a scene; and
   a processor coupled to the memory, the processor to:
      attain a first planar image representative of the scene based on the plurality of planar images;
      determine, based on a viewer position relative to a display region, a first crop position of the first planar image and a second crop position of the first planar image;
      crop the first planar image to a cropped planar image to fill the display region based on the first and second crop positions, wherein the first and second crop positions define an asymmetric frustum of the first planar image corresponding to a virtual window representing the display region, the first crop position is at a position away from a midpoint of the first planar image toward a first edge of the first planar image by a ratio of a product of a focal length corresponding to the first planar image and a lateral position of virtual viewer position from the first edge of the virtual window to a distance of the virtual viewer position from the virtual window, and the virtual viewer position corresponds to the viewer position; and
      provide the cropped planar image for presentation to the viewer.

2. The system of claim 1, wherein the first edge of the first planar image and the first edge of the virtual window are one of corresponding top, bottom, left, or right edges.

3. The system of claim 1, wherein the second crop position is at a second position away from the midpoint of the first planar image toward a second edge of the first planar image by a ratio of a product of the focal length and a difference between the width of the virtual window and the lateral position of the virtual viewer position from the first edge of the virtual window to the distance of the user from the virtual window.

4. The system of claim 1, wherein the second crop position is at a position away from the midpoint of the first planar image toward the first edge of the first planar image by a ratio of a product of the focal length and a difference between the lateral position of the virtual viewer position from the first edge of the virtual window and a width of the virtual window to the distance of the virtual viewer position from the virtual window.

5. The system of claim 1, wherein the processor to crop crops the first planar image at the first and second crop positions in a first dimension and at third and fourth crop positions in a second dimension based on an aspect ratio of the display region.

6. The system of claim 1, the processor further to:
   attain, after a viewer moves to a second viewer position, a second planar image representative of the scene based on a second plurality of planar images of the scene; and
   determine, based on the second viewer position relative to the display region, a third crop position of the second planar image and a fourth crop position of the second planar image, wherein a first virtual viewer position corresponding to the viewer position is between first and second edges of the virtual window and a second virtual viewer position corresponding to the second viewer position is outside one of the first and second edges of the virtual window and wherein the first and second crop positions are on opposite sides of a midpoint of the first planar image and the third and fourth crop positions are on the same side of a midpoint of the second planar image.

7. The system of claim 1, wherein the plurality of planar images comprise images captured via an array of cameras, wherein the viewer position translates to an image capture position of one of the array of cameras, and wherein the first planar image comprises a corresponding one of the plurality of captured planar images.

8. The system of claim 1, wherein the plurality of planar images comprise images captured via an array of cameras, wherein the viewer position translates to a position between first and second cameras of the array of cameras, and wherein the processor to attain the first planar image comprises the processor to:
   synthesize the first planar image between a second planar image and a third planar image corresponding to the first and second cameras, respectively, by generation of bi-directional disparity maps based on the second and third planar images and warp of the second and third planar images to the first planar image based on the bi-directional disparity maps.

9. The system of claim 1, wherein the processor to provide the cropped planar image for presentation to the viewer comprises the processor to transmit the cropped planar image to a receiving device having a display screen comprising the display region.

10. The system of claim 1, wherein the processor to provide the cropped planar image for presentation to the viewer comprises the processor to transmit the cropped planar image to a display screen comprising the display region.

11. A method for generating a virtual view from multi-view images comprising:
   attaining a first planar image representative of a scene based on a plurality of planar images of the scene;
   determining, based on a viewer position relative to a display region, a first crop position of the first planar image and a second crop position of the first planar image;
   cropping the first planar image to a cropped planar image to fill the display region based on the first and second crop positions, wherein the first and second crop positions define an asymmetric frustum of the first planar image corresponding to a virtual window corresponding to the display region, the first crop position is at a position away from a midpoint of the first planar image toward a first edge of the first planar image by a ratio of a product of a focal length corresponding to the first planar image and a lateral position of virtual viewer position from the first edge of the virtual window to a distance of the virtual viewer position from the virtual window, and the virtual viewer position corresponds to the viewer position; and
   providing the cropped planar image for presentation to the viewer.

12. The method of claim 11, wherein the second crop position is at a second position away from the midpoint of the first planar image toward a second edge of the first planar image by a ratio of a product of the focal length and a difference between the width of the virtual window and the lateral position of the virtual viewer position from the first edge of the virtual window to the distance of the user from the virtual window.

13. The method of claim 11, wherein the second crop position is at a position away from the midpoint of the first planar image toward the first edge of the first planar image by a ratio of a product of the focal length and a difference between the lateral position of the virtual viewer position from the first edge of the virtual window and a width of the virtual window to the distance of the virtual viewer position from the virtual window.

14. The method of claim 11, wherein said cropping crops the first planar image at the first and second crop positions in a first dimension and at third and fourth crop positions in a second dimension based on an aspect ratio of the display region.

15. The method of claim 11, further comprising:
attaining, after a viewer moves to a second viewer position, a second planar image representative of the scene based on a second plurality of planar images of the scene; and
determining, based on the second viewer position relative to the display region, a third crop position of the second planar image and a fourth crop position of the second planar image, wherein a first virtual viewer position corresponding to the viewer position is between first and second edges of the virtual window and a second virtual viewer position corresponding to the second viewer position is outside one of the first and second edges of the virtual window and wherein the first and second crop positions are on opposite sides of a midpoint of the first planar image and the third and fourth crop positions are on the same side of a midpoint of the second planar image.

16. At least one non-transitory machine readable medium comprising a plurality of instructions that, in response to being executed on a computing device, cause the computing device to generate a virtual view from multi-view images by:
attaining a first planar image representative of a scene based on a plurality of planar images of the scene;
determining, based on a viewer position relative to a display region, a first crop position of the first planar image and a second crop position of the first planar image;
cropping the first planar image to a cropped planar image to fill the display region based on the first and second crop positions, wherein the first and second crop positions define an asymmetric frustum of the first planar image corresponding to a virtual window corresponding to the display region, the first crop position is at a position away from a midpoint of the first planar image toward a first edge of the first planar image by a ratio of a product of a focal length corresponding to the first planar image and a lateral position of virtual viewer position from the first edge of the virtual window to a distance of the virtual viewer position from the virtual window, and the virtual viewer position corresponds to the viewer position; and
providing the cropped planar image for presentation to the viewer.

17. The machine readable medium of claim 16, wherein the second crop position is at a second position away from the midpoint of the first planar image toward a second edge of the first planar image by a ratio of a product of the focal length and a difference between the width of the virtual window and the lateral position of the virtual viewer position from the first edge of the virtual window to the distance of the user from the virtual window.

18. The machine readable medium of claim 16, wherein the second crop position is at a position away from the midpoint of the first planar image toward the first edge of the first planar image by a ratio of a product of the focal length and a difference between the lateral position of the virtual viewer position from the first edge of the virtual window and a width of the virtual window to the distance of the virtual viewer position from the virtual window.

19. The machine readable medium of claim 16, wherein said cropping crops the first planar image at the first and second crop positions in a first dimension and at third and fourth crop positions in a second dimension based on an aspect ratio of the display region.

20. The machine readable medium of claim 16, further comprising instructions that, in response to being executed on the computing device, cause the computing device to generate a virtual view from multi-view images by:
attaining, after a viewer moves to a second viewer position, a second planar image representative of the scene based on a second plurality of planar images of the scene; and
determining, based on the second viewer position relative to the display region, a third crop position of the second planar image and a fourth crop position of the second planar image, wherein a first virtual viewer position corresponding to the viewer position is between first and second edges of the virtual window and a second virtual viewer position corresponding to the second viewer position is outside one of the first and second edges of the virtual window and wherein the first and second crop positions are on opposite sides of a midpoint of the first planar image and the third and fourth crop positions are on the same side of a midpoint of the second planar image.

* * * * *